US008165013B2

(12) United States Patent
Gbadegesin et al.

(10) Patent No.: US 8,165,013 B2
(45) Date of Patent: Apr. 24, 2012

(54) NETWORKED COMPUTER WITH GATEWAY SELECTION

(75) Inventors: Abolade Gbadegesin, Seattle, WA (US);
Amit Aggarwal, Bellevue, WA (US);
David G. Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 11/404,199

(22) Filed: Apr. 14, 2006

(65) Prior Publication Data

US 2007/0242601 A1    Oct. 18, 2007

(51) Int. Cl.
*G01R 31/08* (2006.01)
(52) U.S. Cl. .......................... 370/218; 370/244; 370/248
(58) Field of Classification Search .................... None
See application file for complete search history.

(56) References Cited

U.S. PATENT DOCUMENTS

| | | | |
|---|---|---|---|
| 5,936,936 A | | 8/1999 | Alexander, Jr. et al. |
| 5,995,485 A | * | 11/1999 | Croslin ........................... 370/216 |
| 6,078,957 A | * | 6/2000 | Adelman et al. ............... 709/224 |
| 6,148,410 A | * | 11/2000 | Baskey et al. ........................ 714/4 |
| 6,157,648 A | | 12/2000 | Voit et al. |
| 6,581,166 B1 | | 6/2003 | Hirst et al. |
| 6,778,502 B2 | | 8/2004 | Ricciulli |
| 6,826,623 B1 | | 11/2004 | Brown et al. |
| 6,882,653 B1 | | 4/2005 | Kiuchi et al. |
| 6,973,313 B1 | | 12/2005 | Sebastian |
| 2002/0018480 A1 | * | 2/2002 | Galicki et al. ................. 370/401 |
| 2002/0131362 A1 | | 9/2002 | Callon |
| 2002/0147839 A1 | * | 10/2002 | Boucher et al. ............... 709/238 |
| 2003/0165160 A1 | * | 9/2003 | Minami et al. ................. 370/466 |
| 2004/0208161 A1 | * | 10/2004 | Meese ........................... 370/351 |
| 2004/0221296 A1 | | 11/2004 | Ogielski et al. |

(Continued)

FOREIGN PATENT DOCUMENTS

| | | |
|---|---|---|
| EP | 1 278 348 A1 | 1/2003 |
| EP | 1566930 A1 | 8/2005 |
| WO | WO 2004/093397 A1 | 10/2004 |

OTHER PUBLICATIONS

Narten T., "Neighbor Discovery and Stateless Autoconfiguration in IPv6," Jul. 1999, IEEE Internet Computing, 3 Issue 4, pp. 54-62.*

(Continued)

*Primary Examiner* — Man Phan
*Assistant Examiner* — Ryan Kavleski
(74) *Attorney, Agent, or Firm* — Wolf, Greenfield & Sacks, P.C.

(57) ABSTRACT

A networked computer system in which a gateway is selected for efficient transmission over a network using a layered protocol. When a transmission over the network fails, information at multiple protocol layers indicates the usability of the gateway through which the failed transmission was made. In a layered protocol with an application or connection layer, a path layer and a link layer, information at the link layer is used to determine whether retransmission through the same gateway should be attempted. Information at the path layer is used to determine whether the gateway is faulty. Information from the application or connection layer is used to determine whether responses are received to transmissions. These determinations are used in setting the status of the gateway, which in turn is used to prioritize gateways when selecting a gateway for future transmissions. The system also temporarily raises the priority associated with a gateway so that it will be used in a transmission, which can reveal that the state of the gateway should be changed.

19 Claims, 6 Drawing Sheets

U.S. PATENT DOCUMENTS

2004/0258239 A1    12/2004  Gallant et al.
2005/0195754 A1*    9/2005  Nosella .................. 370/255
2005/0195835 A1     9/2005  Savage et al.
2006/0056303 A1*    3/2006  Aggarwal et al. ........... 370/248
2007/0008880 A1*    1/2007  Buchko et al. ............. 370/218

OTHER PUBLICATIONS

International Search Report from International Patent Application PCT/US2007/009311.

Koponen, et al., Internet Architecture Study Group, (Spring 2005), downloaded from http://www.tml.tkk.fi/Opinnot/T-110.7910/2005/koponen-sarela-ylitalo-2005, on.

White, "High Availability in Routing," *The Internet Protocol Journal*, vol. 7, No. 1, Mar. 2004, pp. 1-40.

Narten et al., Neighbor Discovery for IP Version 6 (IPv6), *Network Working Group*, Dec. 1998, downloaded from http://www.ietf.org/rfc/rfc2461.txt, on Apr. 7, 2006.

* cited by examiner

NETWORKED COMPUTER WITH GATEWAY SELECTION

BACKGROUND

Networks facilitate the exchange of information between applications running on different computers. Computers with applications that share data with other computers are used pervasively in both personal and business settings. As a result, networks are now widely used in both homes and offices to transmit many types of information.

Information sent over a network is traditionally formatted in packets. Each packet contains a header with routing information, which allows network devices to process the packet so that it reaches its intended destination. Each packet is traditionally formatted according to a protocol, which specifies what routing information is included the header and how network devices respond to that information. For example, a protocol may specify that a device receiving a packet generate an acknowledgement message so that the device sending the packet learns that the packet was received.

Multiple layers of routing information are needed to provide sufficient information for all network devices to route information from an application on one computer to an application on another computer. At the highest interconnection layer, a specific application on a computerized device must be specified. At the lowest layer, each computerized device is connected to a local network and has an address on that local network, which must also be specified. A middle layer is also required because networks may be formed from interconnected local networks, and information must be specified to allow information to be routed from one local network to another. These layers may be called, from highest to lowest, a connection or application layer (depending on the protocol), a path layer and a link layer.

A network will frequently operate according to a layered protocol, with each layer being a protocol that specifies processing of a packet, or other interactions, appropriate for one interconnection layer. For example, a widely used layered protocol is the TCP/IP/ARP layered protocol. TCP is a protocol used at the connection layer. IP is a protocol used at a path layer, and ARP is a protocol used at the link layer.

In many computers, a network stack formats information and performs other processing required to comply with a layered protocol. The network stack frequently is part of the computer's operating system and contains a number of software modules, each performing processing appropriate for one protocol layer.

To ensure that information is properly transmitted over a network, the network stack manages the process of transmitting a packet, including compensating for errors. For example, if the network stack attempts to transmit a packet and does not receive an acknowledgement within a timeout period, the network stack may make another attempt to transmit the message. The network stack may make multiple attempts to transmit a packet until successful or until it eventually reports to the application attempting to send information that the transmission failed.

A network stack may also select transmission parameters to increase the likelihood that a packet reaches it destination. For example, in a computer that has multiple "gateways" to a network through which packets could be sent, a network stack may select a gateway for transmission of a packet deemed best for transmission of the packet. The gateway could be selected based on information about whether packets with similar addresses had been previously routed successfully through that gateway.

Information specifying which gateways had been previously used for transmission to specific destination addresses is stored in a routing table. The routing table stores, for prior successful transmissions, the destination address and the gateway used. As each new packet is transmitted, a routing module within the network stack selects an entry in the routing table, which specifies a gateway through which that packet is transmitted.

Selection of an entry in a routing table may be based on multiple criteria. One criteria is the closeness of the match between an address in the routing table and the destination address in that packet to be transmitted. Matching is performed based on the number of identical bits in the prefixes of the addresses being compared. If no address in the routing table matches any prefix bits of the destination address in a packet, the network stack transmits the packet through a "default gateway."

To avoid attempting to transmit packets through a gateway that could not support communication, the status of the default gateway may be monitored. In the MICROSOFT WINDOWS XP® operating system, the network stack classifies the default gateway as "dead" if 75% of the transmissions over connections that use the default gateway fail. When the default gateway is classified as "dead," it is not used for further transmissions. If another gateway is classified as "live," the live gateway is used. However, if there is no "live" gateway, the transmission fails.

SUMMARY OF INVENTION

Gateway selection according to the invention may reduce the time required for each transmission, reduce the circumstances in which a transmission fails or improve network communication by increasing the number of circumstances in which the best available gateway is used for a transmission.

Gateway selection involves prioritizing gateways based on the success or failure of prior transmissions. As each new transmission is processed, priority information may be used to select a gateway. For example, if a transmission fails, the priority assigned to the gateway used for the failed transmission may be lowered and a new gateway may be selected based on previously computed priorities.

However, not every failed transmission attempt results in selecting a new gateway or reprioritizing the gateway used for a failed attempt. In a networked computer operating according to a layered protocol, information from multiple protocol layers may be used for gateway selection to more accurately determine the status of a gateway. For example, information may be obtained from a link layer, indicating whether network neighbors are reachable through a gateway. Alternatively, information may be obtained through the path layer to determine a quantity of paths that are unreachable through a gateway. Similarly, information may be obtained through the connection or application layer to determine whether responses are received for transmissions sent through a gateway. By using information from other protocol layers, a more accurate assessment of the status of a gateway can be made, which avoids disqualifying a gateway for use based on transmission problems unrelated to the gateway and avoids time spent attempting to transmit through a gateway that will not support a transmission.

Prioritizing gateways improves selection of a gateway, even if all gateways have experienced at least one transmission failure. Further, the priority of a gateway can be periodically raised to test whether a gateway through which a transmission previously failed is usable, which increases the likelihood that the best available gateway will be used for a transmission.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various Figures. is represented by a like numeral. For purposes of clarity, not every component may be labeled in every drawing. In the drawings.

DETAILED DESCRIPTION

Figure 1:
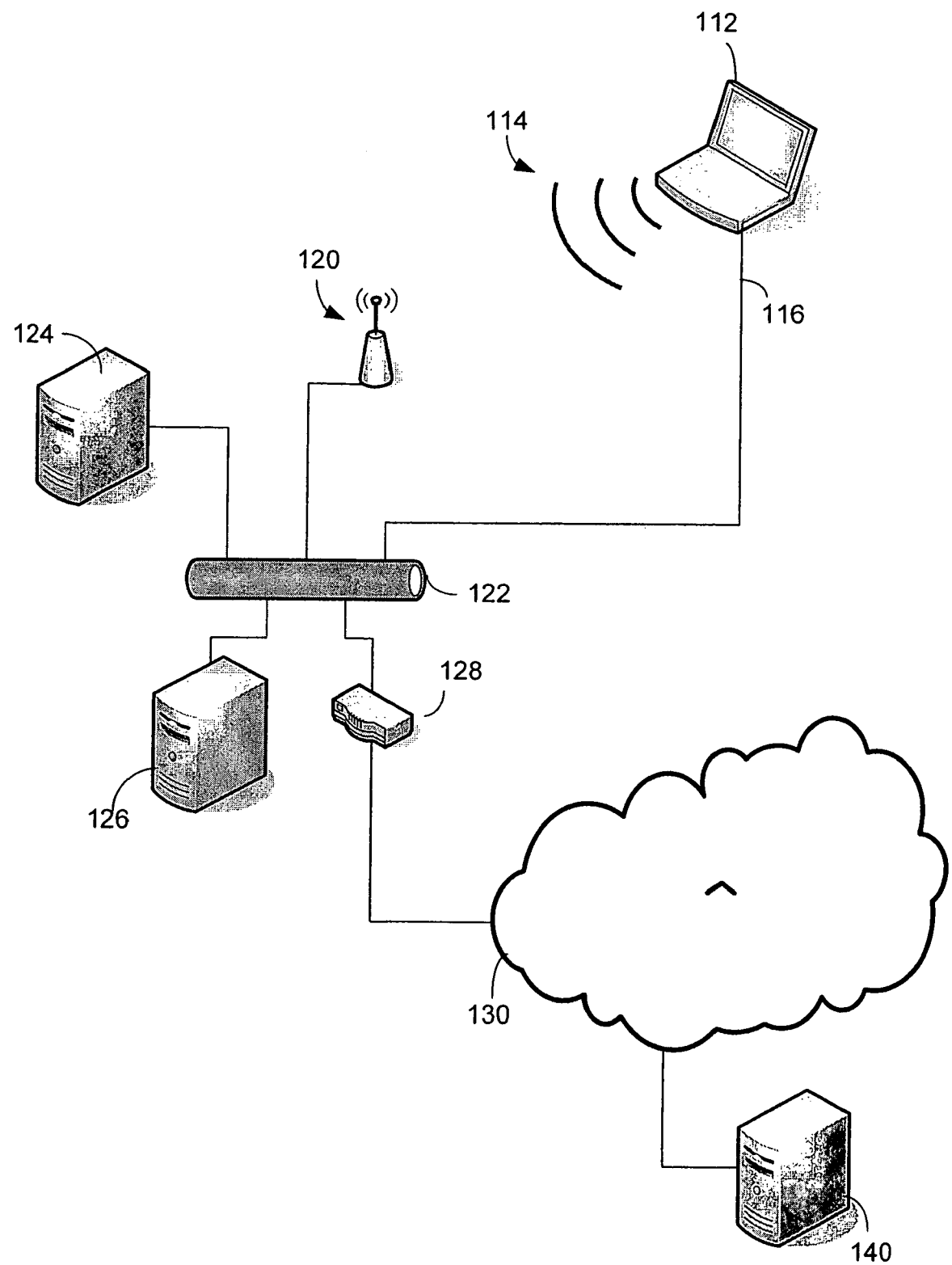
FIG. 1 is a sketch of a computing environment containing a laptop computer according to an embodiment of the invention.

Gateway selection according to embodiments of the invention may be implemented by programming a computer operating in a conventional network environment. FIG. 1 shows a network in which gateway selection according to an embodiment of the invention may be used. A computer, such as laptop computer 112, is connected to the network. Laptop computer 112 has multiple gateways. A gateway selection process is described below using as an example transmission of packets by laptop 112, which may be programmed to perform gateway selection according to an embodiment of the invention.

As shown in FIG. 1, laptop computer 112 is connected to local area network (LAN) 122. Other devices may be connected to LAN 122. In the example of FIG. 1, computers 124 and 126 are shown connected to LAN 122. The devices connected to LAN 122 are considered "neighbors" of laptop computer 112.

Laptop computer 112 can communicate with neighbor devices without transmitting packets through a device that connects LAN 122 to a broader network. In the example of FIG. 1, router 128 is shown coupling LAN 122 to a wide area network, which may be Internet 130. The connection through router 128 allows a device connected to LAN 122 to communicate with a remote device, such as remote server 140, that is also connected to Internet 130.

The network of FIG. 1 may operate according a layered protocol as in a conventional network. Accordingly, each device connected to the network may have an address specified at the link layer of the layered protocol. Applications within laptop computer 112 may establish connections with applications running on remote devices, such as remote server 140, in accordance with the protocol of the connection layer. Each connection may be associated with a path in compliance with the protocol of the path layer of the network.

As shown in FIG. 1, laptop computer 112 may connect to local area network 122 over wireless link 114. Wireless link 114 connects laptop computer 112 to LAN 122 through wireless access point 120. In addition, laptop computer 112 is connected to LAN 122 through wired link 116. In the configuration illustrated, laptop computer 112 is said to have multiple gateways through which packets may be transmitted. Packets transmitted through one gateway are intended to pass over wireless link 114 to LAN 122. Packets transmitted through a second gateway are intended to pass over wired link 116 to LAN 122. Within LAN 122, the packets may be processed according to the rest of the protocol information in the packet so that each packet should ultimately reach its intended destination.

Packets transmitted through either gateway should ultimately reach a device connected to the network. However, problems can arise in network transmission that prevent a packet from reaching its destination. Because packets transmitted through different gateways may encounter different problems, one gateway may be more suitable for sending a transmission than the others. Accordingly, laptop computer 112, and other devices with multiple gateways, may be programmed to select an appropriate gateway for each packet based on routing information specified in the path protocol layer.

The system of FIG. 1 may be implemented using conventional hardware devices. Those devices may be programmed using conventional programming techniques to create applications, establish connections, process information according to a layered protocol, build a routing table and to transmit a packet through a selected gateway. However, in the example of FIG. 1, laptop computer 112 is additionally programmed to select gateways for transmission of packets according to an embodiment of the invention.

Figure 2:
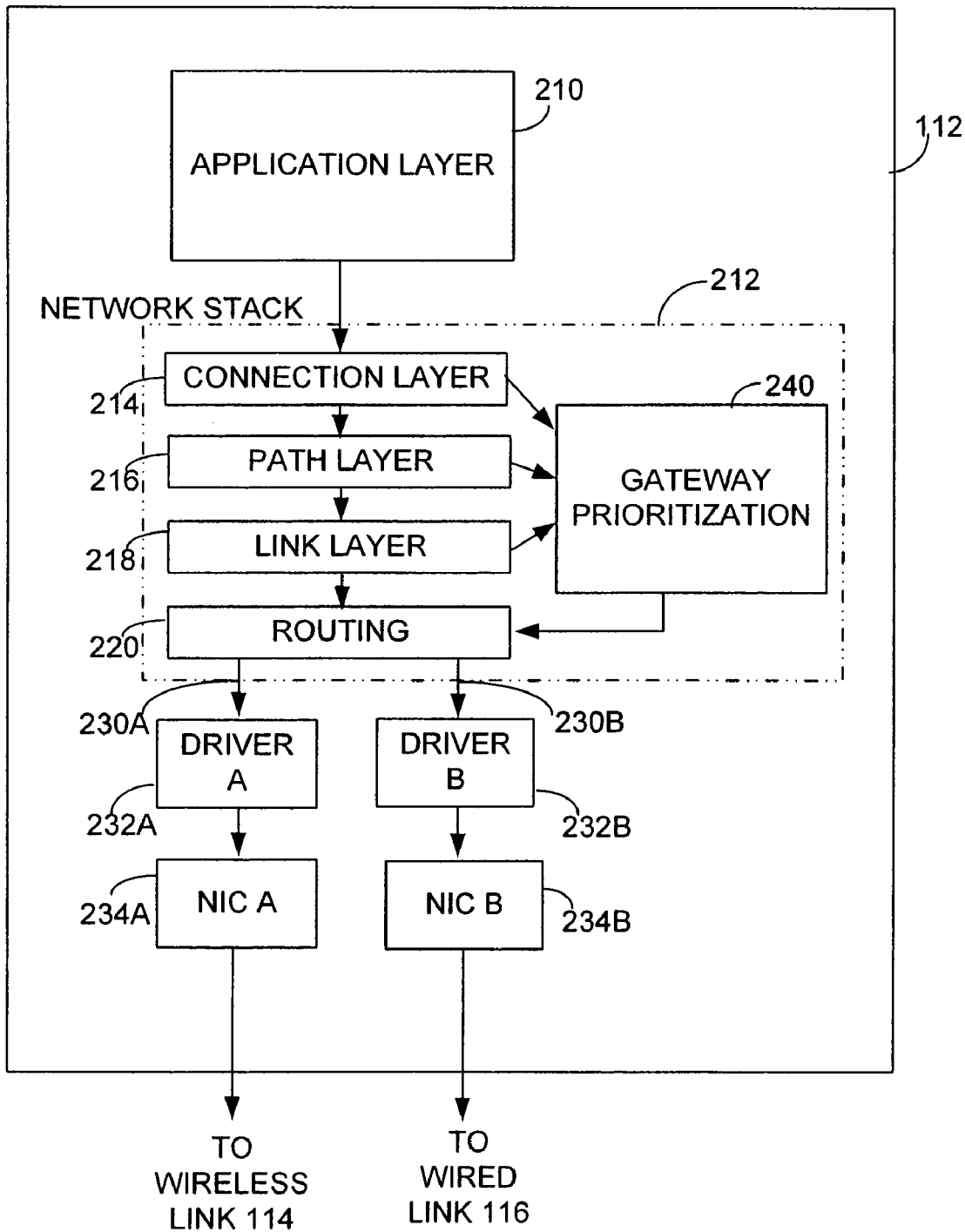
FIG. 2 is a block diagram of the software architecture of a computer programmed according to an embodiment of the invention.

FIG. 2 shows a block diagram of a software architecture that may be used in implementing the programming for laptop computer 112 or other device performing gateway selection according to an embodiment of the invention. FIG. 2 shows that computer 112 is programmed with an application layer 210. Application layer 210 represents one or more applications that laptop computer 112 performs. Application layer 210, for example, may contain a word processing program, an e-mail program, a web browser, or any other desired application program. Each application generates information for transmission to other devices. Information for transmission is passed from application layer 210 to network stack 212.

As in a conventional computer, network stack 212 may be implemented as a portion of the operating system of laptop computer 112. Also as in a conventional computer, network stack 212 may be implemented in multiple layers, each layer corresponding to a protocol layer of a layered protocol used on the network. In the example of FIG. 12, processing at each of the protocol layers is illustrated to be performed by a separate software module. Accordingly, network stack 212 includes connection layer 214, path layer 216 and link layer 218. Such an implementation is conventional, but it is not a requirement of the invention that processing had each layer be preformed in a separate module.

In the example of FIG. 2, connection layer 214 implements processing according to a TCP protocol. However, any suitable connection level protocol may be used. As an application in application layer 210 needs to send information to a destination application in another device, connection layer 214 establishes a TCP connection from that application in layer 210 to the destination application. Any information passed to network stack 212 identifying that TCP connection will be processed by network stack 212 to generate packets formatted to pass through the network to the destination application.

Each connection must specify the destination device in which the corresponding application resides. The destination device is specified at the path layer. Accordingly, each connection formed in connection layer 214 is associated with a path within path layer 216. Such processing may also be as in a conventional networked computer. Processing performed at link layer 218 may also be as in a conventional networked computer.

Once a packet is processed in link layer 218, routing module 220 selects a gateway for transmission of the packet. In the illustration of FIG. 2 in which laptop computer 112 has two gateways, routing module 220 selects between gateway 230A and 230B.

If gateway 230A is selected, routing module 220 directs the packet to driver 232A, which controls a network interface card 234A. Network interface card 234A provides a physical interface through which laptop computer 112 may connect to a network. In this example, network interface card 234A connects to wireless link 114. Accordingly, network interface card 234A may be a wireless network interface card such as is conventionally used in a laptop computer. However, the specific physical connection made to gateway 230A is not important to the invention, and any suitable connection may be used.

Conversely, routing module 220 may select gateway 230B for transmission of a packet. In that circumstance, routing module 220 passes the packet to driver 232B, which controls network interface card 234B. In the example of FIG. 2, gateway 230B connects laptop 112 to LAN 122 through a wired link. Accordingly, network interface card 234B may be a convention network interface card designed to interface to LAN 122 through a cable.

Routing module 220 may select between gateways 230A and 230B, or more generally between any gateways in laptop computer 112, using processing intended to maximize the likelihood that the packet will reach the intended destination efficiently. An example of processing to select a gateway is described below in connection with FIG. 5.

One aspect of gateway selection is prioritizing the gateways. Gateway priorities are assigned by gateway prioritization module 240. Gateway prioritization module 240 assigns each gateway a priority representing the likelihood that the gateway is functioning for transmission of packets. An example of the processing performed in gateway prioritization module 240 is given below in connection with FIG. 4.

In embodiments described herein, priorities of gateways are related to the state of the gateway. In some embodiments, one of three states is assigned to each gateway. Those states are "LIVE," "DEAD" and "PROBE." However, additional or different status codes may be used to define a priority for a gateway.

A status code of "LIVE" may indicate the highest priority and could be assigned to gateways either known to be functioning or that have not experienced sufficient failures that a problem with the gateway is indicated. Conversely, a status code of "DEAD" may indicate the lowest priority and could be assigned to gateways that have experienced sufficient failures that a problem with the gateway is indicated. A status code of "PROBE" may indicate an intermediate priority and may be temporarily assigned to gateways previously classified as "DEAD so that these gateways will occasionally be used to attempt a transmission.

Attempting a transmission through a gateway from time-to-time allows the status of a DEAD gateway to be changed if conditions on the gateway change so that the gateway no longer warrants classification as a DEAD gateway. For example, radio frequency interference may make a gateway using a wireless link DEAD at one time, but that interference could be removed so that the gateway is again usable. Similarly, a gateway incorrectly classified as DEAD because many transmissions through that gateway failed for reasons unrelated to a failure in the gateway could be returned to a LIVE status.

FIGS. 3A, 3B, 3C and 3D illustrate data structures used in the processing within network stack 212. These figures illustrate conceptually how data is stored in RAM within laptop computer 112. Data is graphically depicted as being stored contiguously in memory. However, the precise organization of the information and the type and location of the memory in which it is stored are not critical to the invention. Any suitable way may be used to store the data.

Figure 3A:
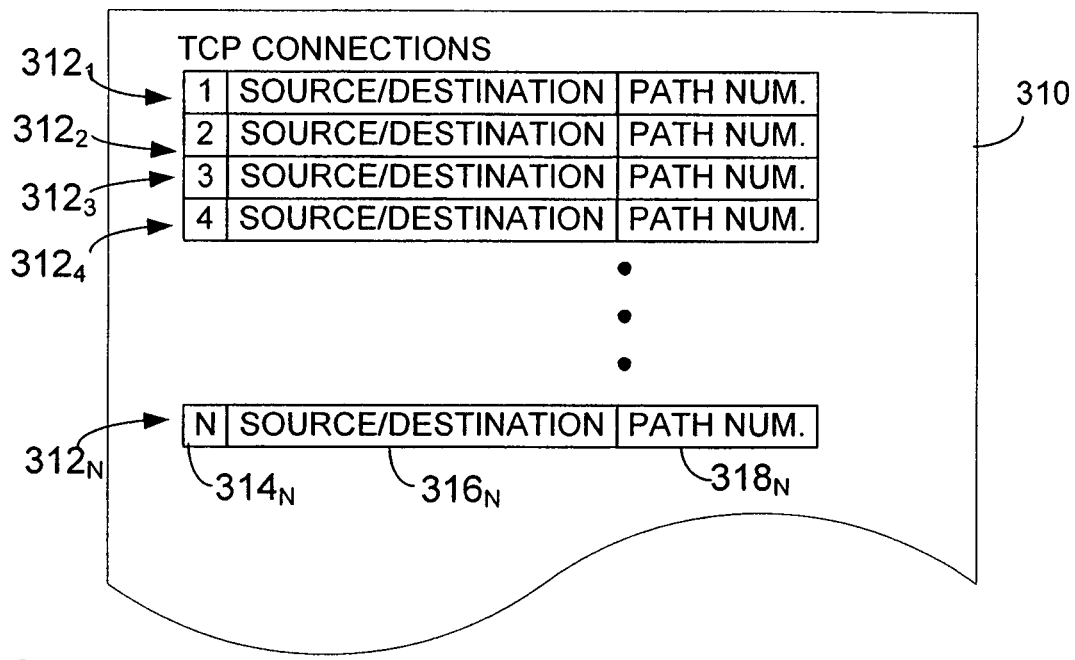
FIGS. 3A, 3B, 3C and 3D are illustrations of data structures used by a computer programmed according to an embodiment of the invention.

FIG. 3A shows a connection data structure 310 used for processing within connection layer 214. As described above, applications within application layer 210 form connections with applications in the application layers of other devices. Each connection uniquely identifies a source and destination application. Connection data structure 310 illustrates the types of information that may be stored about connections.

In the example of FIG. 3A, connection data structure 310 includes multiple records $312_1, 312_2 \ldots 312_N$. Each record stores information about one connection. Record $312_N$ stores data about connection N and illustrates the types of data that is stored for each connection. Record $312_N$ contains multiple fields, of which fields $314_N$, $316_N$ and $318_N$ are shown. Field $314_N$ is an identifier for the connection described by the rest of the data in row $312_N$. In this example, connections are numbered sequentially from 1 through N, but any suitable representation may be used. The connection identifier in field $314_N$ may be used by connection layer 214 to identify the connection over which information provided by application layer 210 is to be transmitted.

Figure 3B:
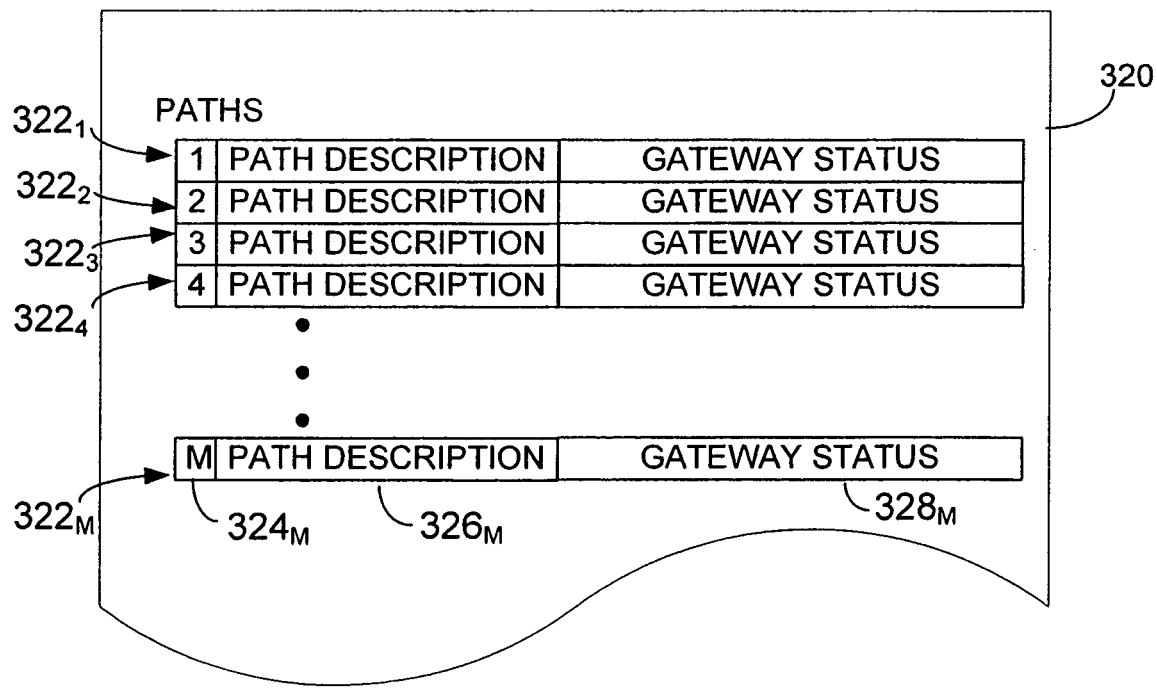

Field $316_N$ provides information about the source and destination applications for information transmitted using connection N. Each source and destination may be identified by port number or any other suitable identifier. Additionally, record $312_N$ includes field $318_N$, which identifies a path used for transmission of information over connection N. In the illustrated embodiment, each path is described by information stored in path data structure 320 (FIG. 3B). Accordingly, information stored in field $318_N$ may identify a record within path data structure 320 (FIG. 3B).

Connection data structure 310 does not contain information specifically used in gateway selection or gateway prioritization. Accordingly, network stack 212 may generate and process information describing a connection in a conventional manner.

FIG. 3B shows path data structure 320 according to an embodiment of the invention. Path data structure 320 includes records $322_1, 322_2 \ldots 322_M$. Each of the records holds information about one path that may be used for communication between laptop computer 112 and another device.

Each of the records $322_1, 322_2 \ldots 322_M$ stores the same type of information. Record $322_M$ stores information about path M and illustrates the type of information that is stored for each path. Record $322_M$ contains multiple fields, of which fields $324_M$, $326_M$ and $328_M$ are shown.

Field $324_M$ contains an identifier for the path described in record $322_M$. Field $324_M$ may store information in any suitable form to identify the path described by the remainder of record $322_M$. In this example, paths are numbered sequentially from 1 through M, but any suitable representation may be used. The identifier stored in field $324_M$ may be the same identifier stored within field $318_N$ (FIG. 3A) to associate a specific path with a connection.

Field $326_M$ stores information describing a specific path. Because a path is an association between a source and destination computer, field $326_M$ includes an address for the source and destination computer in path M. Other information about path M required for processing in accordance with the specific path protocol used by a network to which computer 112 is connected may also be stored within field $326_M$. Though field $326_M$ is shown as a unitary field, it may contain one or more subfields to store the required information.

Record $322_M$ also includes a field $328_M$, which stores information about gateways through which packets addressed for path M have been transmitted. Field $328_M$ may also contain one or more subfields, each providing information on a different gateway. The information stored in field $328_M$, for example, may indicate whether a transmission on path M through the gateway succeeded or failed. Information on gateway status associated with each path may be used in gateway selection or prioritization as described in greater detail below.

Figure 3C:
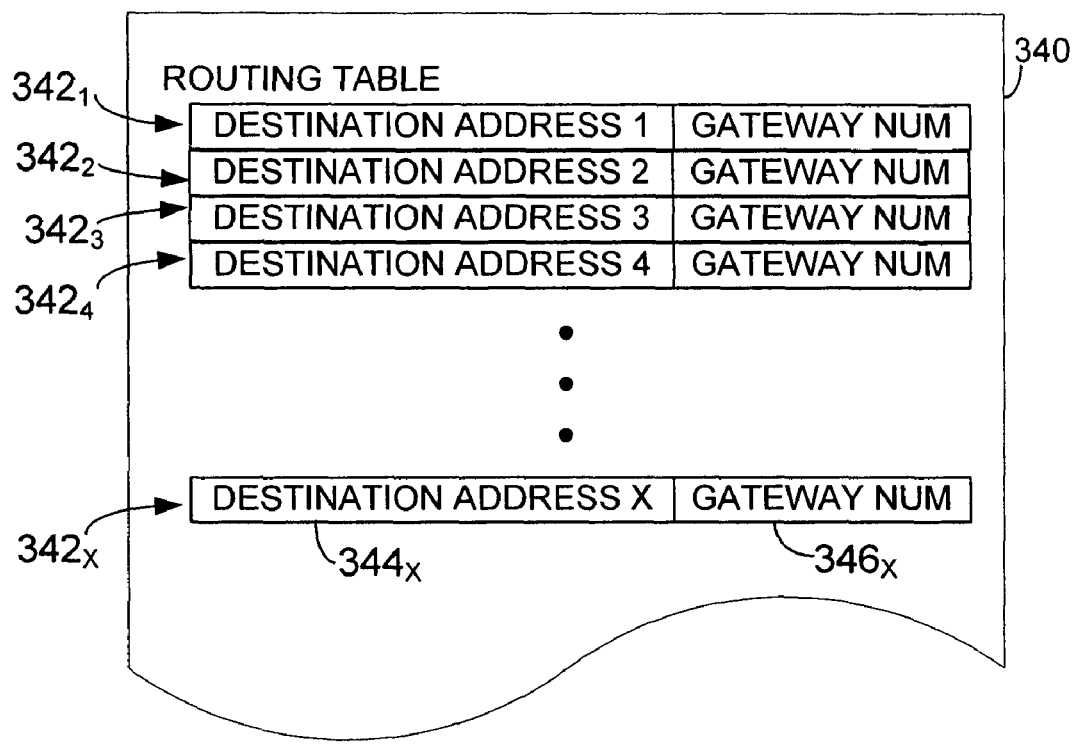

FIG. 3C illustrates routing table 340. Routing table 340 is a data structure used as part of gateway selection within routing module 270 (FIG. 2). Routing table 340 may be a routing table as is conventionally built and used in networked computer system. Routing table 340 associates a specific destination address with a gateway through which transmissions addressed to a specific destination address may be sent. As in a conventional system, routing table 340 may be built by caching destination and gateway information following each successful transmission.

As shown in FIG. 3C, routing table 340 includes records $342_1, 342_2 \ldots 342_x$. Each record provides an association between a destination address and a gateway. Taking record $342_x$ as illustrative, each record includes a field $344_x$ and a field $346_x$. Field $344_x$ stores a destination address and field $346_x$ identifies a gateway through which a packet addressed to that address was successfully transmitted.

Figure 3D:
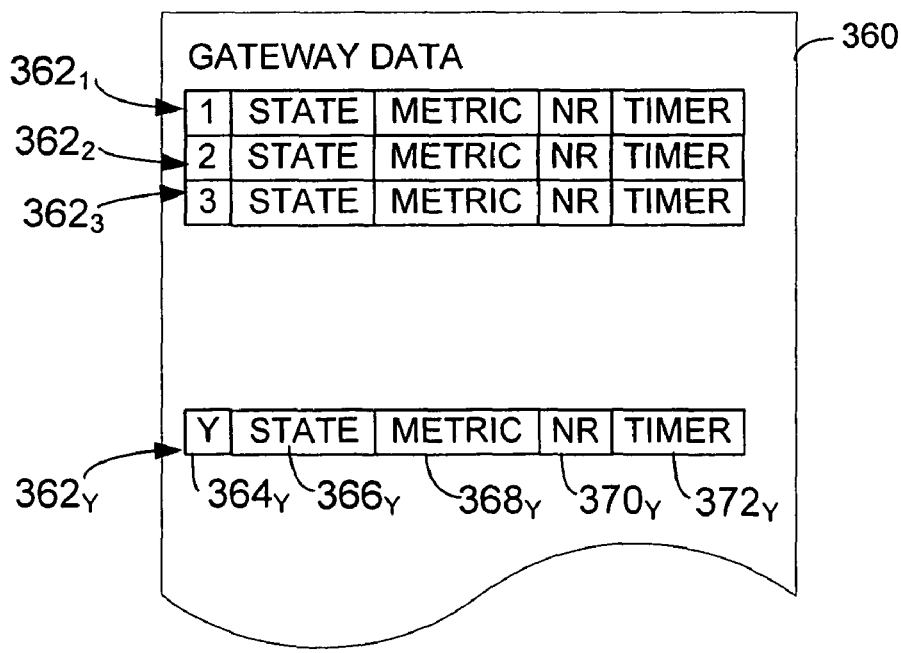

FIG. 3D illustrates gateway data structure 360. Gateway data structure 360 stores information concerning the gateways in laptop computer 112. In the example of FIG. 3D, each gateway is described by a record in gateway data structure 360. In the illustration of FIG. 3D, records $362_1, 362_2 \ldots 362_y$ are shown. Record $362_y$ stores data about gateway Y and illustrates the types of data that is stored for each gateway. Record $362_y$ contains multiple fields, of which fields $364_y$, $366_y$, $368_y$, $370_y$ and $372_y$ are shown. Field $364_y$ stores an identifier for the gateway identified by the data in record $362_y$. In this example, the gateways are numbered sequentially from 1 to Y. These identifiers provide a mechanism for a gateway to be identified in field $346_x$ of routing table 340 (FIG. 3C), but any suitable manner may be used to identify a gateway.

Field $366_y$ identifies a state assigned to gateway Y. In some embodiments, the state can be "LIVE," "DEAD" or "PROBE," and field $366_y$ may store a value indicating one of these states. The value in field $366_y$ may be assigned by gateway prioritization module 240 (FIG. 2), though each gateway may be initialized to indicate that it is in a LIVE state. As described in more detail below, the states of the gateways may be used to prioritize the gateways when selecting a gateway for transmission of a packet.

Gateway data structure 360 may also contain other information used in selecting a gateway for transmission of a packet. Field $368_y$ stores a performance metric for gateway Y. The information stored in field $368_y$ may be obtained as in a conventional networked computer. For example, a network interface card may measure one or more parameters of transmissions, which may serve as a metric for a gateway. Examples of metrics that may be suitable are data rate, measured noise, percentage of dropped packets and received signal strength.

Field $370_y$ stores a further performance parameter associated with gateway Y. In this example, field $370_y$ stores a Boolean value indicating whether a neighbor of computer 112 can be reached through gateway Y. Neighbor reachability may be determined by transmitting a "neighbor reachability probe" using information available at the link layer of the layered protocol. For example, the address resolution protocol (ARP) specifies a format of transmissions on a network that allow one computer to determine whether there are links joining that computer to a neighbor. The value in field $370_y$ may be set using processing as in a conventional networked system.

Field $372_y$ stores a time value. The value in field $372_y$ may also be used within gateway prioritization module 240 (FIG. 2) as part of the gateway selection process. As described in more detail below, once a gateway is assigned a DEAD state because communications through that gateway failed, gateway prioritization module 240 may from time to time set the state of that gateway to PROBE. Setting the state to PROBE alters the priority of the gateway, increasing the likelihood that the gateway will be selected by routing module 270 (FIG. 2). As a result, a gateway with a PROBE state may be used for an attempted transmission.

The value in field $372_y$ may be used by gateway prioritization module 240 to determine an appropriate time to alter that state associated with gateway Y. Any suitable format may be used to store information in field $372_y$. For example, the value stored in field $372_y$ may identify a time at which the state of gateway Y should be set to PROBE. Alternatively, the value in field $372_y$ may identify a time at which the priority of gateway Y was most recently set to DEAD. These time values may be specified in offsets of a system clock of computer 112 or any other suitable format.

Different or additional information may be stored in gateway data structure 360. For example, information identifying the paths or the number of paths used by a gateway may be stored.

Figure 4:
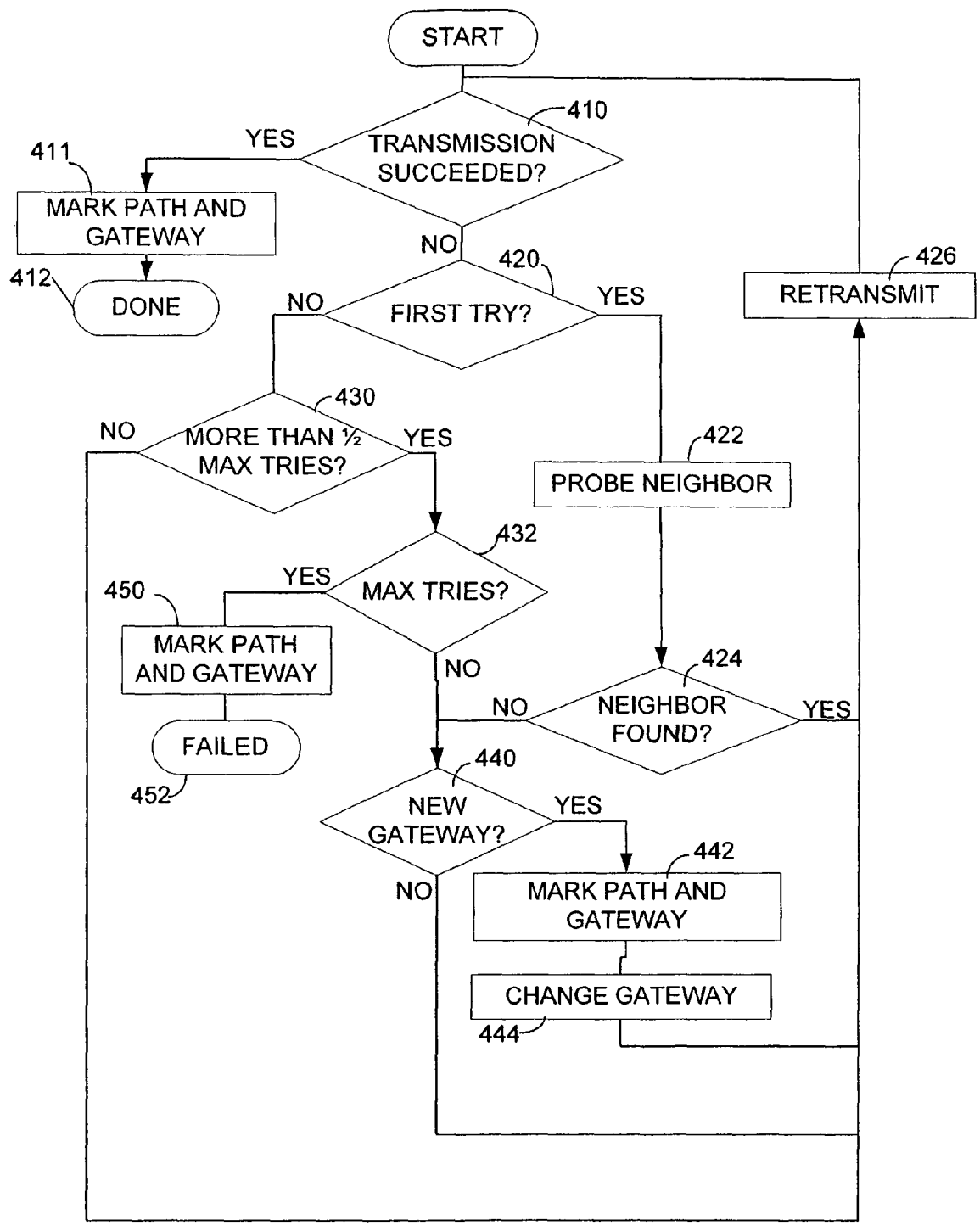
FIG. 4 is a flow chart of a process for transmitting a packet according to an embodiment of the invention.

Turning now to FIG. 4, processing performed as part of transmission of a packet is illustrated. The processing of FIG. 4 is described in connection with components of network stack 212 (FIG. 2) and data structures as shown in FIGS. 3A . . . 3D. However, the process may be implemented with any suitable hardware or software.

The process of FIG. 4 starts following a first attempt at transmission of the packet. At decision block 410, the process branches depending on whether the transmission attempt succeeded. If the transmission succeeded, no changes to either the selected gateway or prioritization of the gateway used for the transmission are required. Accordingly, the process branches to block 411.

At block 411, a record in path database 320 (FIG. 3B) may be updated. If necessary, the record corresponding to the path over which the packet was successfully sent is updated to indicate the gateway used for the transmission.

In some circumstances, processing at block 411 may also alter that state assigned to the gateway through which a transmission succeeded. If a gateway is in a PROBE state, the gateway was previously classified as DEAD, but a transmission is being made through that gateway as a way to test whether a defect still exists with the gateway. A successful transmission through the gateway may be taken as an indication that the gateway is LIVE, and processing at block 411 may change the state of the gateway accordingly.

In other embodiments, different or additional processing may be performed at block 411 to indicate whether a gateway in a PROBE state should be indicated as LIVE. For example, the status of a gateway may be changed to LIVE only if multiple transmissions succeed through that gateway. However, regardless of the specific processing performed at block 411, processing thereafter proceeds to termination point 412, where processing of the packet within network stack 212 concludes.

Conversely, if the transmission attempt failed, processing proceeds from decision block 410 to decision block 420. At decision block 420, the process branches depending on whether the failed transmission attempt was the first transmission attempt for the packet. On the first failed transmission attempt, the process branches to block 422.

At block 422 information from the link layer of the protocol is used to select a gateway for a subsequent transmission attempt. In this example, information from the link layer is obtained by probing for network neighbors. For a computer connected to a network using the address resolution protocol (ARP) at the link layer, probing for network neighbors may be performed according to that protocol. However, any suitable method of obtaining information from the link layer concerning connections through the gateway may be employed.

The results of probing for network neighbors at block 422 may be recorded in gateway data structure 360 in connection with the gateway used for the failed transmission attempt. Specifically, information obtained at block 422 on a gateway Y may be used to update field 370y. Additionally, the results of probing at block 422 may be used to control branching as processing proceeds to decision block 424.

At decision block 424, the process branches depending on whether a network neighbor was identified as a result of probing at block 422. If a neighbor is reachable through the gateway, a failed transmission attempt is unlikely to have been caused by a faulty gateway. Accordingly, processing branches from decision block 422 to block 426 where a further attempt is made to transmit the packet through the same gateway.

Conversely, if probing at the link layer was unable to reach a neighbor, retransmission through the same gateway is unlikely to be successful. Accordingly, in this circumstance, the process branches from decision block 424 to decision block 440.

At decision block 440 a check is made whether there is an alternative gateway available. As described above, routing module 270 selects the best available gateway based on multiple criteria that are explained in greater detail in conjunction with FIG. 5, below. The first transmission attempt is made with the gateway best meeting the criteria applied by routing module 270. When processing reaches decision block 440, the gateway ranked second highest based on the criteria applied by routing module 270 is identified. If a next best gateway exists, processing branches to block 442.

At block 442, the data structures used by network stack 212 are updated to indicate that an attempted transmission through a gateway was unsuccessful. In this example, path data structure 320 is updated and gateway data structure 360 may be updated. The record in path data structure 320 associated with the path through which the transmission was attempted is updated. That record is updated to indicate the gateway through which failed transmission attempt was made. For example, if the attempted transmission was on path M using gateway Y, record $322_M$ may be updated. Within record $322_M$, field $328_M$ may be updated to indicate an attempted transmission through gateway Y failed.

At block 442, information in gateway data structure 360 may also be updated, if appropriate. Because a transmission could fail for many reasons unrelated to a problem with a gateway, a gateway is not deemed DEAD if a single transmission fails through that gateway. In the described embodiment, processing at block 442 determines whether a sufficient number of transmission attempts through the gateway have failed to warrant a conclusion that the gateway is defective with sufficient confidence to lower its priority.

In some embodiments, a faulty gateway is deemed DEAD based on the percentage of paths using that gateway over which transmissions have failed. Processing at block 442, for example, may access path data structure 320 (FIG. 3B). Gateway status fields in each of the records $322_1, 322_2, \ldots 322_M$ may be accessed. The information stored in these fields provides a quantitative measure of the number of paths using the same gateway as the failed transmission attempt. If this measure is large enough, the gateway is deemed DEAD. If the percentage exceeds a threshold, the gateway may be deemed defective and gateway data structure 360 (FIG. 3D) may be updated. Specifically, if gateway Y is deemed defective, the value in field $366_y$ may be set to a value of DEAD, giving gateway Y a low priority in subsequent processing to select a gateway.

In one embodiment, the percentage of paths using the same gateway as the failed transmission attempt is used as the quantitative measure. The precise value used for the threshold is not crucial to the invention. In some embodiments, the threshold will be a percentage between 50 and 100 percent. In some embodiments, the percentage will be approximately 75 percent.

A gateway used for a failed transmission attempt may also be have its state changed if it was in the PROBE state. This circumstance indicates that the gateway was previously marked as DEAD and was given a status of PROBE to increase the likelihood that it would be selected for transmission as a way to test whether the gateway was still exhibiting transmission problems. In this circumstance, a single transmission failure through the gateway may be taken as an indication that further transmission attempts through the gateway would be inefficient and the gateway is properly marked as DEAD. Accordingly, processing at block 444 may also change from PROBE to DEAD the status of a gateway through which a transmission failed. However, in other embodiments, different or additional criteria may be used to change the state of a gateway from PROBE to DEAD. These different or additional criteria may be applied at block 442.

Once path data structure 320 and, if appropriate, the gateway data structure 360 have been updated to block 442, processing proceeds to block 444. At block 444, the gateway associated with the packet being transmitted is changed. Any suitable manner may be used to change the gateway associated with a packet being transmitted. For example, routing module 220 (FIG. 2) may store information indicating that subsequent attempts to transmit the packet are to be directed to the newly selected gateway. Regardless of the specific mechanism used to change the gateway at block 444, processing again loops back to block 426. At block 426 a further attempt is made to retransmit the packet.

Following an attempt to retransmit the packet, the process branches back to decision block 410. If the retransmission attempt is successful, the process branches from decision block 410 to block 411 and then to termination point 412, as described above. Conversely, if the second attempt is unsuccessful, the process again passes to decision block 420. Following the second attempt to transmit a packet, the process branches from decision block 420 to decision block 430.

At decision block 430 a check is made whether the number of transmission attempts for a packet has exceeded one-half of the maximum times that a transmission will be attempted before a transmission failure is declared. The maximum number of transmission attempts for a packet is a parameter that may be set as part of configuring a computer or in any other suitable manner. The exact value of that parameter and the manner in which it is set are not critical to the invention.

If the transmission has not been attempted one-half of the maximum number of attempts, the process branches again to block 426 where a further transmission attempt is made through the same gateway. The process will continue to loop back through decision block 430 and block 426 until either the transmission is successful, in which case the processing will reach termination point 412, or one-half of the maximum number of transmission attempts will be exceeded.

When processing loops back to decision block 430 after one-half the maximum number of transmission attempts has been exceeded, processing branches from decision block 430 to decision block 432. At decision block 432 a check is made whether the specified maximum number of transmission attempts has been exceeded. If the maximum number of attempts has not been exceeded, further attempts at transmission are made. However, further attempts are made with a different gateway, if one is available. Accordingly, processing branches to decision block 440, where further transmission attempts are made as described above.

As with the prior transmission attempts, if the attempt succeeds, the process branches to block 411 and termination point 412. However, if no transmission attempt is successful, the maximum number of transmission attempts will eventually be exceeded. At this point, processing will branch from decision block 432 to block 450.

At block 450, path data structure 320 and, if appropriate, gateway data structure 360 will be updated. Processing performed at block 450 may be the same as that described above in connection with block 442. Thereafter, processing proceeds to termination point 452 where it was ultimately deemed that the overall transmission failed.

The processing pictured in FIG. 4 serves as one example of how gateways may be efficiently assigned to one of multiple states. Though a packet is transmitted over a connection, which is at one layer of a layered protocol, information at both the path and link layers of the layered protocol is used to determine whether a gateway is selected for a specific packet sent over a connection.

Information at the link layer limits the number of unsuccessful attempts that will be made using a gateway through which successful transmission is unlikely. In the specific example, probing at the link layer is used to control the number of transmission attempts are made through a gateway before a new gateway is tried. Reducing the number of transmission attempts can decrease the overall time required to transmit a packet and may also decrease the likelihood that that the transmission will timeout and fail without transmitting the packet. Either or both of these results can increase the experience of a user of laptop computer 112. Both of these results is particularly important for users of computers that may have three or more gateways.

Information at the path layer is used to reduce the likelihood that an operational gateway is deemed dead incorrectly. Declaring a path as dead, if it is fact operational, means that subsequent transmissions may not use the most efficient gateway. Using information at the path layer is more accurate than simply using information from the connection layer as in the prior art. Because multiple connections may be carried over a single path, a failure in that path can create a large number of failed connections. If only information from the connection layer is used to assess whether a gateway is dead, a gateway may be classified as dead incorrectly if it is used for a faulty path shared by multiple connections. Using information from the path layer avoids this problem and leads to more accurate classification of gateways.

Further, status information on a gateway, even if the gateway is deemed dead, is not used to preclude all use of a gateway. Rather, the status information is used to establish the priority of a gateway. Setting status in this fashion can increase the efficiency of gateway selection by allowing a gateway that once experienced a problem to be properly classified if the conditions blocking communication through that gateway are altered. Using status to prioritize gateway selection may also allow a gateway that is substandard to be used if it is the best available gateway. In this way, transmissions may continue, though degraded, in situations in which prior art processes may have indicated a communication failure.

Figure 5:
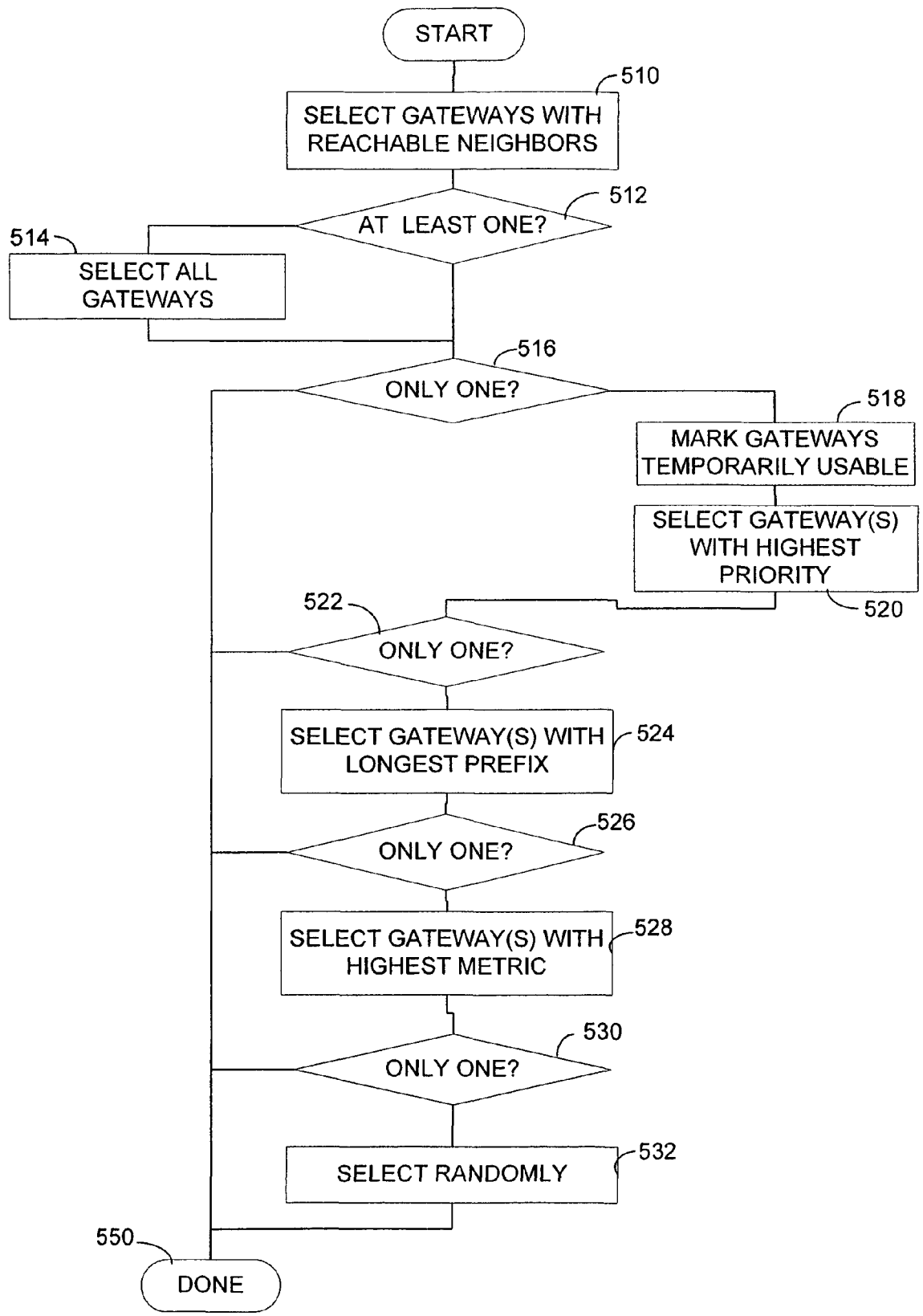
FIG. 5 is a flow chart of the process of selecting a gateway according to an embodiment of the invention.

Turning to FIG. 5, an example is provided of processing that uses status information to prioritize gateways. The process of FIG. 5 applies a series of criteria sequentially until a single gateway is identified. The processing in FIG. 5 provides one example of criteria that may be used and of the order in which the criteria may be applied.

The processing of FIG. 5 begins at block 510. At block 510 the subset of gateways with reachable neighbors is selected. Block 510 may select gateways with reachable neighbors by querying gateway data structure 360. As illustrated in FIG. 3D, each gateway has a record in gateway data structure 360 with a field, such as field $370_4$, that stores an indication of whether neighbors have been detected through that gateway.

Once the processing at block 510 is completed, processing proceeds to decision block 512. At Decision block 512, the process branches based on whether at least one gateway is selected. If no gateways are selected, the process branches to block 514. At block 514 all of the gateways are selected. Selecting all gateways at block 514 is equivalent to ignoring the selection criteria of neighbor reachability when no gateways have a reachable neighbor. Alternatively, if no gateways have reachable neighbors, no gateway may be selected and the transmission may simply fail.

Following block 514, processing proceeds to decision block 516. If processing at block 510 selected one or more gateways with a reachable neighbor, processing will proceed from decision block 512 to decision block 516. Accordingly, regardless of the number of gateways selected at block 510, processing will reach decision block 516. When processing reaches decision block 516, a subset of the gateways, which may includes from one to all of the gateways, has been selected.

At decision block 516 a check is made based on the number of gateways in the subset. If a single gateway has been selected, no further processing is required and processing branches from decision block 516 to termination point 550. Alternatively, if multiple gateways have been selected, processing branches from decision block 516 to block 518.

Block 518 is the beginning of processing in which criteria are sequentially applied to select a gateway. FIG. 5 shows just one example of the types and orders in which the criteria may be applied. For example, in some embodiments, processing at block 524 occurs before processing at blocks 518 and 520.

However, for the illustrated embodiment, process proceeds to block 518 where any gateways previously allocated a low priority are processed to determine if any such gateways should be temporarily assigned a high priority so that the gateway may be probed. In this embodiment, a gateway previously marked DEAD is from time-to-time set to a status of PROBE. As described above, gateway data structure 360 includes a state field, such as field $366_y$, and a time field, such as field $372_y$. Processing at block 518 may examine gateway data structure 360 to identify gateways having a DEAD state for which the value specified in the timer field has been reached. At block 518 each of those gateways may be given a temporary high priority, such as by marking them to be in a PROBE state.

Processing then proceeds to block 520. At block 520 a further selection is made from the subset of gateways previously identified. Only those gateways marked with the highest priority are selected. For purposes of processing at block 520, gateways with a status of LIVE and PROBE may be considered to have the same priority. In the described embodiment, all gateways with those status values are selected, if any. If no gateways have either of those status values, all gateways in the subset with a status of DEAD may be selected. In embodiments in which other status values are used, selection at block 520 may reflect the relative priorities associated with those status values.

Processing then proceeds to decision block 522. If application of selection criteria at block 520 results in a single gateway being identified, processing branches to termination point 550 with the identified gateway being used for the transmission.

If the selection criteria did not result in selection of a single gateway, processing proceeds to block 524. At block 524, the gateway with the longest prefix matching the prefix of the destination address for the packet being transmitted is selected. Processing at block 524 may be performed as in a conventional network stack.

Thereafter, processing proceeds to decision block 526. If processing at block 524 results in selection of a single gateway, processing branches to termination point 550. Conversely, if multiple gateways have the same longest prefix length, processing continues to block 528 where further selection criteria are applied. At block 528, the gateway from the identified subset having the highest metric is selected. Processing at block 528 may be performed as in a conventional network stack.

If selection of a gateway based on a metric results in the selection of a single gateway, processing branches from decision block 530 to termination point 550. However, if multiple gateways in the subset of gateways selected have the same highest metric, processing proceeds to block 532.

At block 532, a further criteria is applied to select a single gateway. In this example, a single gateway is randomly selected from the identified subset of gateways. However, any suitable process may be used to select a single gateway. Thereafter, processing proceeds to termination point 550. When processing reaches termination point 550, regardless of path through the flowchart of FIG. 5, a single gateway has been selected for use in the next transmission. The process of FIG. 5 may be used both to select a gateway for an initial attempt to transmit a packet and at any time that processing reaches block 444 (FIG. 4) and a new gateway is selected. Though, when the process is used at block 444, any gateways through which transmission of the same packet was already attempted are excluded from the subset of gateways selected.

Having thus described several aspects of at least one embodiment of this invention, it is to be appreciated that various alterations, modifications, and improvements will readily occur to those skilled in the art.

For example, the invention was illustrated by a computer programmed to operate according to a TCP/IP/ARP layered protocol. The invention is not limited for use with this protocol. Many computers are programmed to alternatively or additionally communicate according to the UDP/IP/ARP layered protocol.

UDP is an example of a protocol that is not connection oriented. For such protocols, the application typically knows whether a response is to be expected for any transmission, and the absence of a response may be a sign that the selected gateway has failed. Such applications can provide feedback to the networking stack to cause an alternate gateway to be selected, much in the same way that the TCP connection layer provides feedback in the invention. Accordingly, though processing is shown within a network stack, some or all of the processing could be performed in an application layer or in other operating system components.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer that connects to a network through at least one gateway, the computer operating according to a layered network protocol, the layered network protocol having at least a connection or application layer, a path layer and a link layer, the method comprising:
    a) in response to a failure at the connection or application layer of a transmission attempt through a gateway, obtaining information from the link layer concerning connectivity of the computer over the network, wherein obtaining the information from the link layer comprises probing, at the link layer, through the gateway, for a neighbor device other than the gateway; and
    b) using the information to determine usability of the gateway, wherein using the information comprises:
        when the transmission attempt through the gateway fails and, in response to the probing, it is determined that the neighbor device is reachable by the computer through the gateway at the link layer, making another transmission attempt through the gateway; and
        when the transmission attempt through the gateway fails and, in response to the probing, it is determined that the neighbor device is not reachable by the computer through the gateway at the link layer, determining availability of at least one alternative gateway.

2. The method of claim 1, wherein the link layer operates according to an Address Resolution Protocol and the method further comprises sending a neighbor discovery probe using the Address Resolution Protocol.

3. The method of claim 1, further comprising obtaining second information from the path layer, wherein obtaining the second information comprises obtaining an indication of a quantity of paths for which transmissions have failed when using the gateway.

4. The method of claim 3, further comprising indicating that the gateway is in a faulty state when the quantity of paths for which the transmissions have failed exceeds a predetermined quantity.

5. The method of claim 1, wherein, using the information to determine usability of the first gateway comprises:
    i) if the information indicates no connectivity at the link layer, determining usability of the gateway without further attempts to transmit at the connection or application layer; and
    ii) if the information indicates connectivity at the link layer, making at least one further attempt to transmit at the connection or application layer before determining the usability of the gateway.

6. The method of claim 5, further comprising:
    A) if the at least one further attempt to transmit succeeds, determining that the gateway is usable; and
    B) if the at least one further attempt to transmit fails, taking corrective action.

7. The method of claim 6, wherein taking corrective action comprises using an alternative gateway.

8. A computer-readable memory device encoded with computer-executable instructions for controlling a computer that connects to a network through at least one gateway, the computer operating according to a layered network protocol, the layered network protocol having at least a connection or application layer, a path layer and a link layer, the computer-executable instructions performing steps comprising:
    a) in response to a failure at the connection or application layer of a transmission attempt through a gateway, obtaining information from the path layer concerning connectivity of the computer over the network, wherein obtaining the information comprises determining a quantity of paths using the gateway over which communications have failed;
    b) comparing the quantity of paths over which the communications have failed with a threshold to determine usability of the gateway, wherein determining the usability of the gateway comprises reducing a priority of the gateway when the quantity of paths over which the communications have failed exceeds the threshold; and
    c) when it is determined that the gateway is unusable, periodically assigning an increased priority to the gateway to attempt transmissions over the gateway.

9. The computer-readable memory device of claim 8, wherein the computer-executable instructions for performing the step of determining usability of the gateway comprise computer-executable instructions for determining whether a percentage of paths using the gateway over which communications have failed exceeds a predetermined threshold, the predetermined threshold being greater than 50 percent of paths using the gateway.

10. The computer-readable memory device of claim 8, further comprising computer-executable instructions for performing steps comprising:
    c) when the gateway is determined to be unusable, re-determining the usability of the gateway.

11. The computer-readable memory device of claim 10, wherein the computer-executable instructions for re-determining the usability of the gateway comprise computer-executable instructions for:
    i) tracking time since a last determination of the usability of the gateway; and
    ii) after a period of time since the last determination of the usability of the gateway, increasing the priority of the gateway.

12. The computer-readable memory device of claim 11, wherein the computer-executable instructions for re-determining the usability of the gateway further comprise computer-executable instructions for:
    iii) using the gateway in a connection;
    iv) if the connection fails, returning the gateway to a reduced priority state.

13. The computer-readable memory device of claim 8, wherein the path layer operates according to an IP protocol, and the computer-executable instructions for obtaining information from the path layer comprise computer-executable instructions for accessing information stored by a network stack.

14. A computer-readable memory device encoded with computer-executable instructions therein, the computer-executable instructions for controlling a computer that connects to a network through at least one gateway, the computer operating according to a layered network protocol, the layered network protocol having at least a connection layer, a path layer and a link layer, the computer-executable instructions for performing steps comprising:

a) in response to a failure at the connection layer of a transmission through a gateway, obtaining information from the link layer concerning connectivity of the computer over the network, wherein obtaining information from the link layer comprises probing, at the link layer, through the gateway, for a network neighbor other than the gateway to determine whether the network neighbor is reachable through the gateway; and b) using the information to determine usability of the gateway, wherein using the information comprises:

when the transmission through the gateway fails and, in response to the probing, it is determined that the network neighbor other than the gateway is reachable through the gateway, making another transmission through the gateway; and when the transmission through the gateway fails and, in response to the probing, it is determined that the network neighbor other than the gateway is not reachable through the gateway, determining availability of at least one alternative gateway.

15. The computer-readable memory device of claim 14, further comprising computer-executable instructions for performing steps comprising:

d) repeating the transmission through a second gateway, without further retransmission through the gateway when no network neighbor is reachable through the gateway.

16. The computer-readable memory device of claim 15, wherein the computer-executable instructions for determining the usability of the gateway comprise computer-executable instructions for reducing the priority of the gateway when a network neighbor is reachable through the gateway and at least a second failure at the connection layer occurs through the gateway.

17. The computer-readable memory device of claim 15, wherein the connection layer operates according to the TCP protocol and the computer-executable instructions further comprise computer-executable instructions for indicating a failure of a transmission at the TCP layer after a predetermined number of attempts to send the transmission.

18. The computer-readable memory device of claim 16, wherein:

i) the computer-readable medium further comprises a data structure having a record storing information about the gateway, the record comprising a field storing information about the status of the gateway; and ii) the computer-executable instructions for reducing the priority of the gateway comprise computer-executable instructions for changing the value in the field.

19. The computer-readable memory device of claim 14, further comprising computer-executable instructions for determining a time to periodically assigning an increased priority of the gateway.

* * * * *